C. W. MARSH.
SNAP LINK.
APPLICATION FILED MAY 20, 1915.
1,168,817.
Patented Jan. 18, 1916.
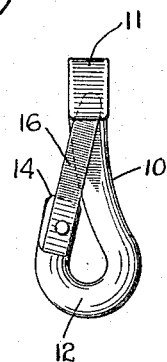
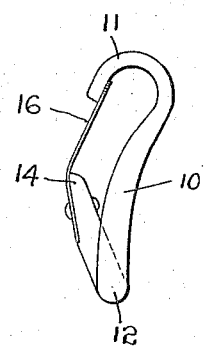
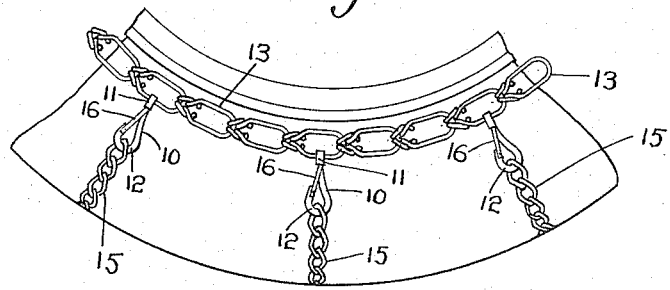
WITNESS
H. W. Meade
INVENTOR
Clifford W. Marsh
BY
F. M. Wooster
ATTORNEY

UNITED STATES PATENT OFFICE.

CLIFFORD W. MARSH, OF BRIDGEPORT, CONNECTICUT.

SNAP-LINK.

1,168,817.     Specification of Letters Patent.     Patented Jan. 18, 1916.

Application filed May 20, 1915. Serial No. 29,321.

*To all whom it may concern:*

Be it known that I, CLIFFORD W. MARSH, a citizen of the United States, residing at Bridgeport, county of Fairfield, State of Connecticut, have invented an Improvement in Snap-Links, of which the following is a specification.

This invention has for its object to provide a snap hook or link adapted for general use and especially adapted for use in connecting sections of chain together where it is required that the body of the connecting element should lie flat upon instead of obliquely to the surface upon which it rests, as in connecting the cross chains to the side chains of a tire grip.

With this and other objects in view, I have devised the novel snap link which I will now describe, referring to the accompanying drawing forming a part of this specification, and using reference characters to indicate the several parts:—

Figure 1 is an elevation of my novel snap link; Fig. 2 a view as seen from the right in Fig. 1, and Fig. 3 is a view illustrating a use of my novel snap link in connecting the cross chains to the side chains of a tire grip.

10 denotes the body of the link, 11 the connecting hook and 12 the holding hook, these names being adopted for convenience in description. The body is curved in the direction of its length to adapt it to lie approximately flat upon a curved surface and the hooks are bent into planes approximately at right angles to each other. The space between the hooks is closed by a spring 16 secured to one of the hooks and adapted to engage the other. The connecting hook is adapted in use to lie in a plane approximately at right angles to what I term the plane of the body; that is, at approximately right angles to a surface (which might be either curved or flat) with which the body might lie in contact. This is in order to permit said hook to be conveniently connected to some other member, as for example the side chain of a tire grip, indicated by 13 in Fig. 3.

In order to leave the holding hook open so that a member to be held thereby may be passed into it freely, the tip of said hook, indicated specifically by 14, is bent outward obliquely from the plane of the body, as clearly shown in Fig. 2. This leaves the hook open without widening it in the plane of the body, and permits a member to be passed into the hook, as will be readily understood from Fig. 2. From the point of view in Fig. 1, the sides of the hook incline toward each other, and the axial line of the tip of the holding hook if extended would apparently intersect the tip of the connecting hook. This construction permits the free end of closing spring 16, to pass under and engage the tip of the connecting hook, as clearly shown in Fig. 2.

The use of my novel snap link is the same as with ordinary snap links or hooks. The closing spring is adapted to yield and to permit a member, as the cross chain of a tire grip, to be passed under the spring and then down into the holding hook, and to also permit the connecting hook to be hooked into a member, as for example the side chain of a tire grip.

It should be understood that the exact shape or contour of the hooks or body is not of the essence of the invention.

Having thus described my invention, I claim:—

1. A snap link comprising a body curved in the direction of its length and having at its ends respectively connecting and holding hooks lying in planes approximately at right angles to each other, and a closing spring secured to the tip of the holding hook and coacting with the tip of the connecting hook.

2. A snap link comprising a body provided at one end with a connecting hook and at the other end with a holding hook, the connecting hook extending approximately at right angles to the body, the holding and the connecting hooks lying in planes approximately at right angles to each other, and a spring secured to one end of the holding hook, the other end of the spring being in engagement with the inner side of the connecting hook.

3. A snap link comprising a body having one end extended at right angles to the body to form a connecting hook, the other end of said body having a bent portion forming a holding hook, the tip of which extends outward obliquely from the body, the holding hook and the connecting hook lying in planes approximately at right angles to each other, and a closing spring secured to the tip of the holding hook and coacting with the tip of the connecting hook.

In testimony whereof I affix my signature.

CLIFFORD W. MARSH.

Copies of this patent may be obtained for five cents each, by addressing the "Commissioner of Patents, Washington, D. C."